UNITED STATES PATENT OFFICE 2,671,111

PREPARATION OF STYRENE DERIVATIVES

John Mann Butler, Centerville, Ohio, assignor to Monsanto Chemical Company, St. Louis, Mo., a corporation of Delaware No Drawing. Application April 8, 1950, Serial No. 154,890

5 Claims. (Cl. 260—592)

This invention relates to the production of styrene derivatives. More particularly the invention pertains to a method of preparing nuclearly acylated α-methylstyrenes. The invention also provides a method of preparing nuclearly acylated α-methylstyrenes from alkyl isopropylphenyl ketones.

An object of the present invention is to provide a commercially feasible method for the preparation of monomeric materials of great value to the synthetic resin and elastomer industries.

Another object of the invention is to provide a new method of producing nuclearly acylated α-methylstyrenes. A further important object of this invention is to provide a method of preparing nuclearly acylated α-methylstyrenes from alkyl isopropylphenyl ketones.

These and other objects which will be hereinafter disclosed are provided by the following invention in which nuclearly acylated α,α-dimethylbenzyl alcohol, or a crude reaction product comprising said alcohol and obtained as described in my copending application, Serial No. 154,889, filed April 8, 1950, now U. S. Patent No. 2,634,294, is subjected to dehydrating conditions. As disclosed in the copending application, nuclearly acylated α,α-dimethylbenzyl alcohols in which the acyl group has from 2 to 5 carbon atoms are oily liquids which are stable at ordinary pressures and temperatures. According to the present invention, acylated α-methylstyrenes are produced by dehydration of said alcohols.

When contacted with dehydrating agents or catalysts, either in the liquid or vapor state, the nuclearly acylated α,α-dimethylbenzyl alcohols readily lose water to yield nuclearly acylated α-methylstyrenes according to the scheme:

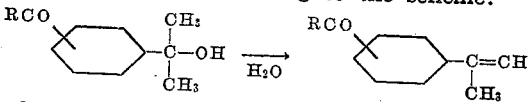

wherein R is an alkyl group of from 1 to 4 carbon atoms.

As examples of dehydrating agents or catalysts employed may be mentioned metal oxides such as alumina or titania, argillaceous materials such as clay, activated alumina, bentonite, silica or silica gel, acid salts such as potassium acid sulfate, etc. The dehydration may be effected in the liquid or vapor state.

When operating in the vapor phase, the dehydration may be effected generally by employing as catalysts inert masses of large surfaces such as activated alumina, silica gel, etc. Temperatures should be above the boiling point of the acylated aralkyl alcohol and below temperatures at which thermal cracking takes place. Temperatures of from 200° C. to 300° C. have been found to give good yields of the nuclearly acylated α-methylstyrenes.

Particularly good results are obtained when the dehydration is effected by distilling the nuclearly acylated α,α-dimethylbenzyl alcohol in the presence of an acidic salt such as sodium bisulfate, potassium bisulfate, or potassium pyrosulfate. Preferably, the distillation is conducted at reduced pressures, say, at from 10 mm. to 100 mm. of Hg pressure.

As disclosed in the copending application referred to above, nuclearly mono-acylated α,α-dimethylbenzyl alcohols in which the acyl group has from 2 to 5 carbon atoms are prepared by contacting an alkyl isopropylphenyl ketone in which the alkyl group has from 1 to 4 carbon atoms with a hydrocarbon hydroperoxide, preferably in the presence of a basically reacting material. The hydrocarbon hydroperoxide is advantageously one having a tertiary carbon atom, e. g., cumene hydroperoxide. The reaction is preferably effected by heating at temperatures of from 100° C. to 160° C. for a time of from one hour to six hours, although heating need not be employed.

For the production of the nuclearly acylated α-methylstyrenes, the aralkyl alcohol need not be separated from the reaction product. The crude reaction product which comprises low-boiling by-products, unreacted alkyl isopropylphenyl ketone, the nuclearly acylated α,α-dimethylbenzyl alcohol and nuclearly acylated acetophenone, may be treated with a dehydrating agent or catalyst to give a mixture of products which includes acylated α-methylstyrene. The α-methylstyrene is readily separated from the other materials by distillation, advantageously in the presence of an inhibitor of polymerization. Also, in some instances, it is desirable before the dehydrating step, to remove from the reaction mixture material boiling below the boiling point of the acylated dimethylbenzyl alcohol, and employ the residue, which consists of a mixture of the alcohol and the diketone, in the dehydrating step. The product obtained from the dehydrating step is then a mixture of the nuclearly acylated α,α-dimethylbenzyl alcohol and nuclearly acylated acetophenone, and the styrene compound is readily obtained from the mixture by removal of the diketone.

The present process thus provides a method for the production of a nuclearly acylated α- methylstyrene from a lower alkyl isopropylphenyl ketone, said method comprising reaction of the ketone with a hydrocarbon hydroperoxide, treatment of the resulting reaction mixture with a dehydrating agent or catalyst and recovering the nuclearly acylated α-methylstyrene from the product.

The invention is further illustrated, but not limited, by the following examples:

Example 1

31.3 g. of substantially pure p-acetyl-α,α-dimethylbenzyl alcohol, B. P. 125° C./2 mm. and 0.9 g. of potassium bisulfate were charged to a still and distilled at 30 mm. of Hg pressure through a 20 plate column. The only fraction distilled was p-acetyl-α-methylstyrene, B. P. 153° C./30 mm., $n_D^{26}=1.5458$, which was obtained in a 68 per cent yield, based on the quantity of p-acetyl-α,α-dimethylbenzyl alcohol charged to the still.

Example 2

This example shows vapor-phase dehydration of a crude p-acetyl-α,α-dimethylbenzyl alcohol. The reactor for this operation consisted of a 1⅜ inch I. D. glass tube packed with a 12 inch section of 4–8 mesh $Al_2O_3$. During the reaction period this packed section was maintained at 210 to 250° C. p-Acetyl-α,α-dimethylbenzyl alcohol (46.6 g.) was distilled at 2 mm. Hg through this reactor during 1½ hours. The outlet gases were condensed in an efficient condenser. After the reaction was complete 15 g. of acetophenone was distilled through the tube to displace any adsorbed products. The total condensate was fractionally distilled yielding first the acetophenone which was discarded then p-acetyl-α-methylstyrene (20.1 g.) and a fraction containing a little p-diacetylbenzene (an impurity in the starting alcohol) and a small amount undehydrated alcohol. The yield of the styrene was 48 per cent.

Example 3

This example is like Example 2, except that 35.5 g. of a very pure p-acetyl-α,α-dimethylbenzyl alcohol was employed and that the reactor was maintained at a temperature of 240 to 270° C., the pressure was 10 mm., and the time was 2.25 hours. The total condensate was fractionated after separation of the water layer, first yielding acetophenone and then 22.9 g. (72 per cent yield) of p-acetyl-α-methylstyrene which was of such high purity as to crystallize.

Example 4

35.3 g. of very pure p-acetyl-α,α-dimethylbenzyl alcohol and 0.45 g. of potassium bisulfate were charged to a still pot and the mixture was distilled at a pressure of 20 mm. of Hg through a Fenske-type column of about 20 theoretical plates. The only fraction collected was the colorless oily p-acetyl-α-methylstyrene, B. P. 150–154° C./30 mm., white crystals, M. P. 42 to 45° C. which was obtained in an 86 per cent yield.

What I claim is:

1. The process of preparing p-acetyl-α-methylstyrene in which p-acetyl-α,α-dimethylbenzyl alcohol is heated at an elevated temperature with an acidic dehydrating agent.

2. The process of preparing p-acetyl-α-methylstyrene in which p-acetyl-α,α-dimethylbenzyl alcohol is contacted at an elevated temperature, in the vapor phase, with an acidic dehydrating catalyst.

3. The process of preparing p-acetyl-α-methylstyrene in which p-acetyl-α,α-dimethylbenzyl alcohol is contacted at an elevated temperature, in the vapor phase, with alumina.

4. The process of preparing p-acetyl-α-methylstyrene in which p-acetyl-α,α-dimethylbenzyl alcohol is distilled in the presence of an acidic salt.

5. The process of preparing p-acetyl-α-methylstyrene in which p-acetyl-α,α-dimethylbenzyl alcohol is distilled in the presence of potassium bisulfate.

JOHN MANN BUTLER.

References Cited in the file of this patent

UNITED STATES PATENTS

| Number | Name | Date |
| --- | --- | --- |
| 2,174,830 | McAllister et al. | Oct. 3, 1939 |
| 2,291,915 | Palmer et al. | Aug. 4, 1942 |
| 2,495,904 | Pines et al. | Jan. 31, 1950 |

FOREIGN PATENTS

| Number | Country | Date |
| --- | --- | --- |
| 540,370 | Great Britain | Oct. 15, 1941 |

OTHER REFERENCES

Mowry et al.: J. Am. Chem. Soc., vol. 68, pages 1105–1109 (1946).

Vandenberg et al.: Ind. Eng. Chem., vol. 40, pages 932–937 (1948).